US006700347B1

(12) United States Patent
Sakurai et al.

(10) Patent No.: US 6,700,347 B1
(45) Date of Patent: Mar. 2, 2004

(54) SPEED VARYING DEVICE

(75) Inventors: Hisao Sakurai, Tokyo (JP); Yasuhiro Shiraishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/203,512

(22) PCT Filed: Mar. 27, 2000

(86) PCT No.: PCT/JP00/01852

§ 371 (c)(1), (2), (4) Date: Aug. 12, 2002

(87) PCT Pub. No.: WO01/74700

PCT Pub. Date: Oct. 11, 2001

(51) Int. Cl.[7] .................................................. H02P 1/24

(52) U.S. Cl. ....................... 318/757; 318/727; 318/807; 318/801

(58) Field of Search ................................ 318/139, 439, 318/729, 376, 448, 759, 483, 783, 471, 490, 801, 757, 727, 807

(56) References Cited

U.S. PATENT DOCUMENTS

| | | | | | |
|---|---|---|---|---|---|
| 5,731,681 | A | * | 3/1998 | Inaniwa et al. | 318/729 |
| 5,814,954 | A | * | 9/1998 | Suzuki et al. | 318/376 |
| 6,066,928 | A | * | 5/2000 | Kinoshita et al. | 318/139 |

* cited by examiner

*Primary Examiner*—Karen Masih
(74) *Attorney, Agent, or Firm*—Sughrue Mion, PLLC

(57) ABSTRACT

This invention is to provide a variable speed apparatus capable of equalizing a moving distance at the time of deceleration from deceleration start to deceleration completion in the case that a deceleration stop command is inputted during acceleration to a moving distance at the time of deceleration from deceleration start to deceleration completion in the case that a deceleration stop command is inputted during operation at an adjustable speed reference frequency even when the deceleration stop command is inputted during acceleration.

2 Claims, 9 Drawing Sheets

SPEED VARYING DEVICE

TECHNICAL FIELD

This invention relates to a variable speed apparatus for performing variable speed control of an induction motor.

BACKGROUND ART

FIG. 7 is a diagram showing a configuration of a conventional variable speed apparatus. In the drawing, numeral 20 is a variable speed apparatus, and numeral 21 is a converter part for converting AC electric power R, S, T from a three-phase AC power source into DC electric power, and numeral 22 is a smoothing capacitor for smoothing a DC voltage converted by the converter part 21, and numeral 23 is an inverter part for converting the DC electric power into AC electric power U, V, W of a variable frequency, a variable voltage. Also, numeral 24 is a storage part for storing data such as adjustable speed patterns of linear adjustable speed or S-shaped curve adjustable speed, etc. set by parameters, an adjustable speed reference frequency fstd, a frequency fmin at the time of low speed, reference acceleration time ta1 for accelerating from 0 Hz to the adjustable speed reference frequency fstd, reference deceleration time td1 for decelerating from the adjustable speed reference frequency fstd to the frequency fmin at the time of low speed, and numeral 25 is a control part for controlling the inverter part 23 based on various data set in the storage part 24 by a start command, a deceleration stop command, etc. and numeral 26 is a motor. Here, the adjustable speed reference frequency fstd is a frequency based in order to calculate a gradient of adjustable speed, and the maximum value of an operating frequency is normally set.

In the conventional variable speed apparatus 20, the adjustable speed patterns, the reference acceleration time ta1, the adjustable speed reference frequency fstd, the reference deceleration time td1, the frequency fmin at the time of low speed, etc. are preset by parameters, and when a start command is inputted, acceleration is performed by the reference acceleration time ta1 to an operating frequency (=adjustable speed reference frequency fstd) commanded by the adjustable speed patterns set, and constant speed operation is performed at the operating frequency (=adjustable speed reference frequency fstd). During the constant speed operation, when a deceleration stop command is inputted, there is performed variable speed control in which deceleration is performed by the reference deceleration time td1 to the frequency fmin at the time of low speed by the adjustable speed patterns set and constant speed operation is performed at the frequency fmin at the time of low speed and then a deceleration stop is made by an input of a stop command. Among these, the reference acceleration time ta1 is set as reference acceleration time for accelerating from 0 Hz to the adjustable speed reference frequency fstd and also, the reference deceleration time td1 is set as reference deceleration time for decelerating from the adjustable speed reference frequency fstd to the frequency fmin at the time of low speed. When an operating frequency targeted at the time of acceleration is different from the adjustable speed reference frequency fstd, acceleration time ta2 is calculated by multiplying the reference acceleration time ta1 by a ratio between the operating frequency targeted at the time of acceleration and the adjustable speed reference frequency fstd, and also when an operating frequency at the time of input of a deceleration stop command is different from the adjustable speed reference frequency fstd, deceleration time td2 is calculated by multiplying the reference deceleration time td1 by a ratio between the operating frequency at the time of input of a deceleration stop command and the adjustable speed reference frequency fstd.

FIG. 8 is a diagram showing a control method of the conventional variable speed apparatus, and FIG. 8(*a*) shows an operation pattern, and FIG. 8(*b*) shows a state of a deceleration stop command/stop command. In the drawing, fstd is an adjustable speed reference frequency, and fmin is a frequency at the time of low speed, and td1 is reference deceleration time for decelerating from the adjustable speed reference frequency fstd to the frequency fmin at the time of low speed, and B is an operation pattern of the case that a deceleration stop command is inputted during operation at the adjustable speed reference frequency fstd, and C is an operation pattern of the case that a deceleration stop command is inputted during acceleration. Also, f2 is a frequency at a point in time when a deceleration stop command is inputted in the operation pattern C, and td2 is deceleration time calculated by expression (1).

$$td2=(f2/fstd)\times td1 \quad \text{expression (1)}$$

The deceleration time td2 is calculated by expression (1) and in the case of linear deceleration, a gradient of deceleration becomes constant and in the case of S-shaped curve deceleration, the gradient of deceleration does not necessarily become constant since a deceleration pattern is again recalculated on the basis of the deceleration time td2 calculated by expression (1) and the operating frequency f2 at the time of deceleration.

Also, in the drawing, an example of an S-shaped curve adjustable speed pattern for smoothing a change in speed at the time of start and stop was shown. a11 and a12 are points in time when a deceleration stop command is inputted, and b11, c11 and d11 are way points of S-shaped curve deceleration in the operation pattern B, and b12, c12 and d12 are way points of S-shaped curve deceleration in the operation pattern C. A range between a11 and b11, a range between c11 and d11, and a range between a12 and b12, a range between c12 and d12 are curve deceleration intervals in the S-shaped curve adjustable speed patterns. Also, d11 and d12 are points in time of completion of the S-shaped curve deceleration, and e11 and e12 are points in time when a stop command is inputted after constant speed operation at the frequency fmin at the time of low speed.

Next, deceleration operation patterns of the conventional variable speed apparatus will be described.

In the case of the operation pattern B, when an area between a11 and b11 is set to Sab11 and an area between b11 and c11 is set to Sbc11 and an area between c11 and d11 is set to Scd11 and a moving distance at the time of deceleration from a point a11 in time of deceleration start to a point d11 in time of deceleration completion is set to Sad11, the moving distance Sad11 at the time of deceleration in the case of the operation pattern B becomes expression (2).

$$Sad11=Sab11+Sbc11+Scd11 \quad \text{expression (2)}$$

Also, in the case of the operation pattern C, when an area between a12 and b12 is set to Sab12 and an area between b12 and c12 is set to Sbc12 and an area between c12 and d12 is set to Scd12 and a moving distance at the time of deceleration from a point a12 in time of start to a point d12 in time of deceleration completion is set to Sad12, the moving distance Sad12 at the time of deceleration in the case of the operation pattern C becomes expression (3).

$$Sad12=Sab12+Sbc12+Scd12 \quad \text{expression (3)}$$

Here, when the moving distance Sad11 at the time of deceleration in the case of the operation pattern B in which the deceleration stop command is inputted during operation at the adjustable speed reference frequency fstd is compared with the moving distance Sad12 at the time of deceleration in the case of the operation pattern C in which the deceleration stop command is inputted during acceleration, it becomes fstd>f2 and further td1>td2 in order to keep a gradient of deceleration constant, so that it becomes Sad11>Sad12.

FIG. 9 is a diagram showing an operation pattern of an elevator. In the drawing, the axis of abscissa is a position and shows stop positions of the first floor, second floor, third floor, fourth floor and fifth floor, and the axis of ordinate is a speed and fmax is the maximum frequency and fmin is the frequency at the time of low speed. Also, h2, h3, h4 and h5 are command positions of a deceleration stop command for making a stop in stop positions of the second floor, third floor, fourth floor and fifth floor at the time of rise. In an operation pattern at the time of fall, a direction differs but it becomes the similar movement, so that only the operation pattern at the time of rise was shown in the drawing.

In the elevator, generally, it is constructed so that sensors are mounted in an elevation passage of the elevator and a pass of a cage is detected to output a deceleration stop command. Deceleration stop command input positions (h2, h3, h4 and h5 in the drawing) which become points in time of this deceleration stop command are determined by a system of the elevator and for example, in the case of moving from the first floor to the third floor through fifth floor, the deceleration stop command is inputted during operation (h3, h4, h5) at the maximum frequency fmax, but in the case of moving from the first floor to the second floor, the deceleration stop command is inputted during acceleration (h2) (movement from the second floor to the third floor, movement from the third floor to the fourth floor and movement from the fourth floor to the fifth floor are also similar).

As described above, in the elevator, in order to make a stop in a stop position of each floor with accuracy, a moving distance at the time of deceleration from the deceleration start to the deceleration completion needs to be kept constant regardless of an operating frequency at a point in time of a deceleration stop command input, but when the conventional variable speed apparatus for decelerating by the deceleration time td2 calculated by multiplying the reference deceleration time td1 by a ratio between the operating frequency at the time of the deceleration stop command input and the adjustable speed reference frequency fstd is used in the case that the operating frequency at the time of the deceleration stop command input is different from the adjustable speed reference frequency fstd, there was a problem that the moving distance at the time of deceleration changes depending on the operating frequency at the point in time of the deceleration stop command input.

Also, in order to make a stop in a constant position regardless of an operating speed at a point in time when the deceleration stop command is inputted, by lengthening time for performing constant speed operation at the frequency fmin at the time of low speed or lengthening deceleration time more than the deceleration time td2 calculated by multiplying the reference deceleration time td1 by a ratio between the operating frequency at the time of the deceleration stop command input and the adjustable speed reference frequency fstd, the moving distance at the time of deceleration can be adjusted, but in this case, there was a problem that operating time at low speed becomes long.

Also, even when the S-shaped curve adjustable speed pattern for smoothing a change in speed at the time of start and stop is adopted, in the case that the deceleration stop command is inputted during acceleration, there was a problem that switching from linear acceleration to S-shaped curve deceleration is performed and a shock becomes large.

This invention is implemented to solve the problems described above, and a first object is to obtain a control method at the time of deceleration stop of a variable speed apparatus capable of making a stop in a constant position even when a deceleration stop command is inputted during acceleration.

Also, a second object is to obtain a control method at the time of deceleration stop of a variable speed apparatus capable of smoothly performing switching of speed change to deceleration when a deceleration stop command is inputted during acceleration.

DISCLOSURE OF THE INVENTION

A variable speed apparatus of this invention is constructed so that in a variable speed apparatus having a converter part for converting AC electric power into DC electric power, a smoothing capacitor for smoothing a DC voltage converted by this converter part, an inverter part for converting the DC electric power into AC electric power of a variable frequency, a variable voltage, and a control part for controlling the inverter part so as to make a deceleration stop after decelerating to a frequency at the time of low speed by deceleration time calculated by multiplying preset reference deceleration time by a ratio between an operating frequency at the time of deceleration stop command input and an adjustable speed reference frequency when a deceleration stop command is inputted, the control part comprises constant speed operating frequency calculation means for calculating a first constant speed operating frequency for performing constant speed operation when the deceleration stop command is inputted during acceleration, and constant speed operating time calculation means for calculating first constant speed operating time by the first constant speed operating frequency in order to equalize a moving distance at the time of deceleration from deceleration start to deceleration completion in the case that the deceleration stop command is inputted during acceleration to a moving distance at the time of deceleration from deceleration start to deceleration completion in the case that the deceleration stop command is inputted during operation at the adjustable speed reference frequency, and when the deceleration stop command is inputted during acceleration, operation is performed at the first constant speed operating frequency by the first constant speed operating time and then deceleration is performed to the frequency at the time of low speed by deceleration time calculated by multiplying the reference deceleration time by a ratio between the first constant speed operating frequency and the adjustable speed reference frequency.

Also, the control part comprises constant speed operating frequency correction means for calculating a second constant speed operating frequency for operating by constant speed operating holding time when the first constant speed operating time is longer than the constant speed operating holding time preset, and it is constructed so that when the deceleration stop command is inputted during acceleration and the first constant speed operating time calculated by the constant speed operating time calculation means is longer than the constant speed operating holding time preset, acceleration is further continued to the second constant speed operating frequency and operation is performed at the second constant speed operating frequency by the constant speed operating holding time and then deceleration is performed to the frequency at the time of low speed by deceleration time calculated by multiplying the reference deceleration time by a ratio between the second constant speed operating frequency and the adjustable speed reference frequency.

Also, the control part comprises deceleration time shortening means for determining the first constant speed operating time calculated by the constant speed operating time calculation means and shortening deceleration time calculated by multiplying the reference deceleration time by a ratio between the first constant speed operating frequency and the adjustable speed reference frequency in order to equalize a moving distance at the time of deceleration from deceleration start to deceleration completion in the case that the deceleration stop command is inputted during acceleration to a moving distance at the time of deceleration from deceleration start to deceleration completion in the case that the deceleration stop command is inputted during operation at the adjustable speed reference frequency when the first constant speed operating time becomes minus.

BEST MODE FOR CARRYING OUT THE INVENTION

First Embodiment

Figure 1:
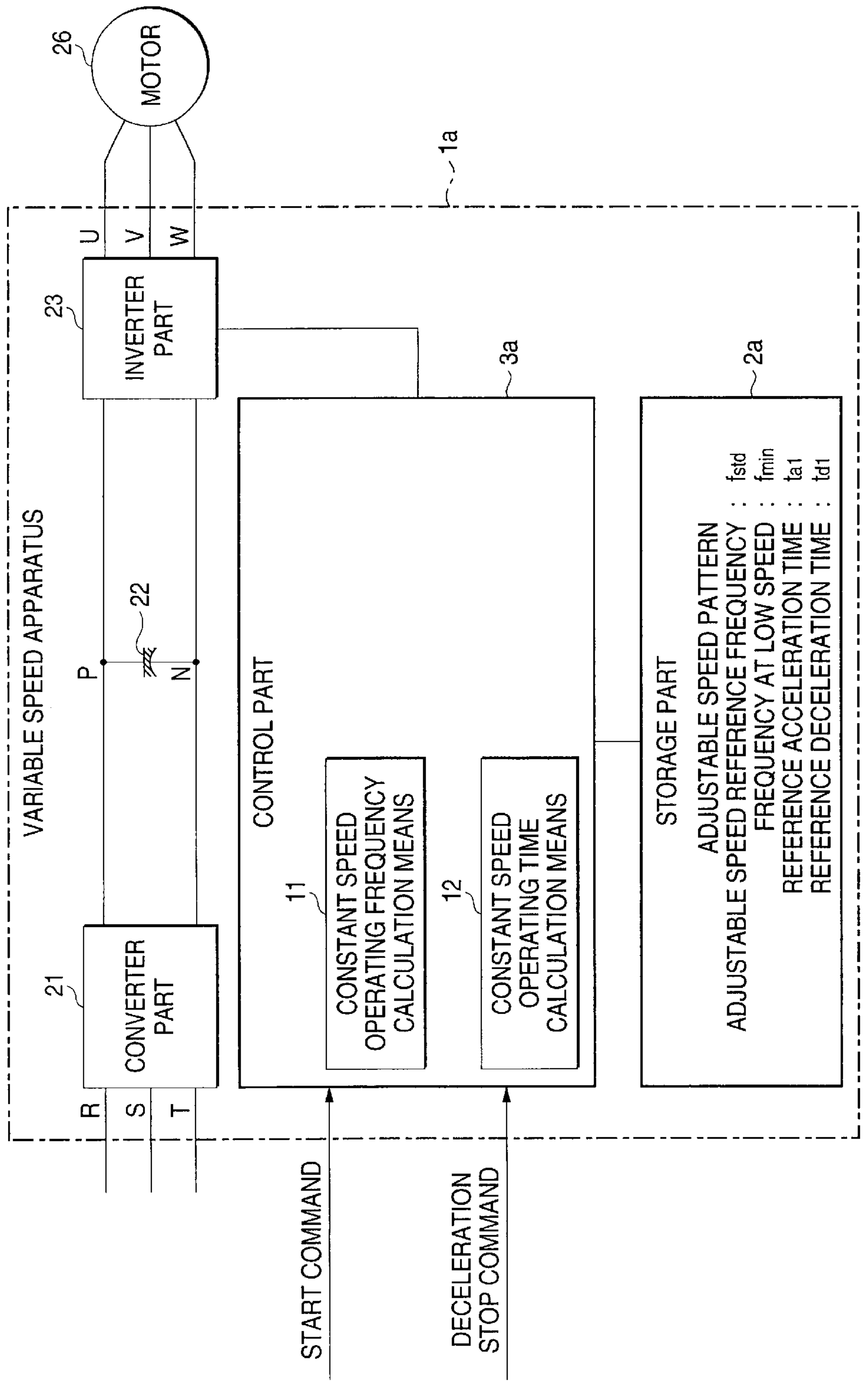
FIG. 1 is a diagram showing a configuration of a variable speed apparatus according to a first embodiment of this invention.
Figure 7:
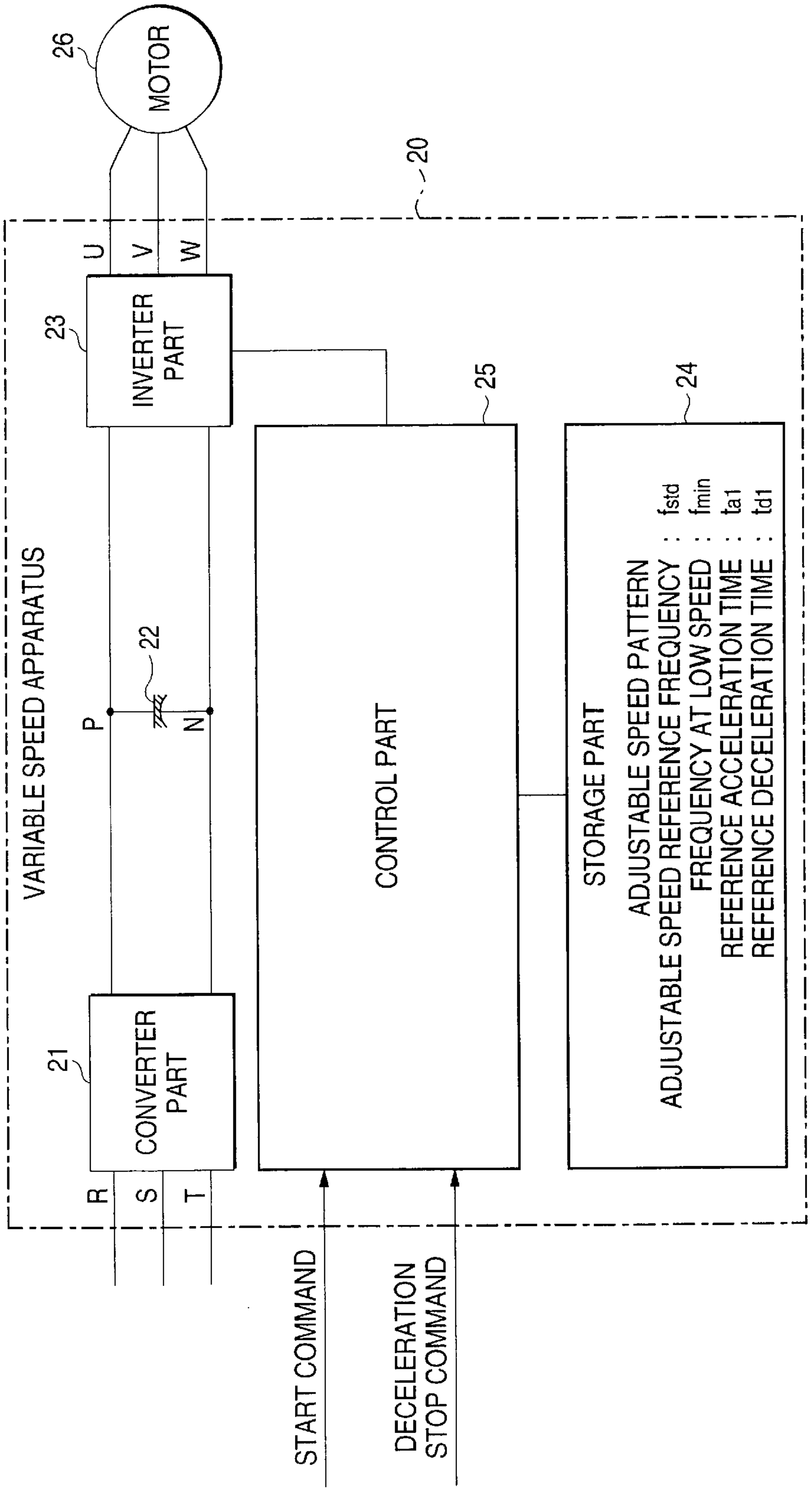
FIG. 7 is a diagram showing a configuration of a conventional variable speed apparatus.
Figure 8:
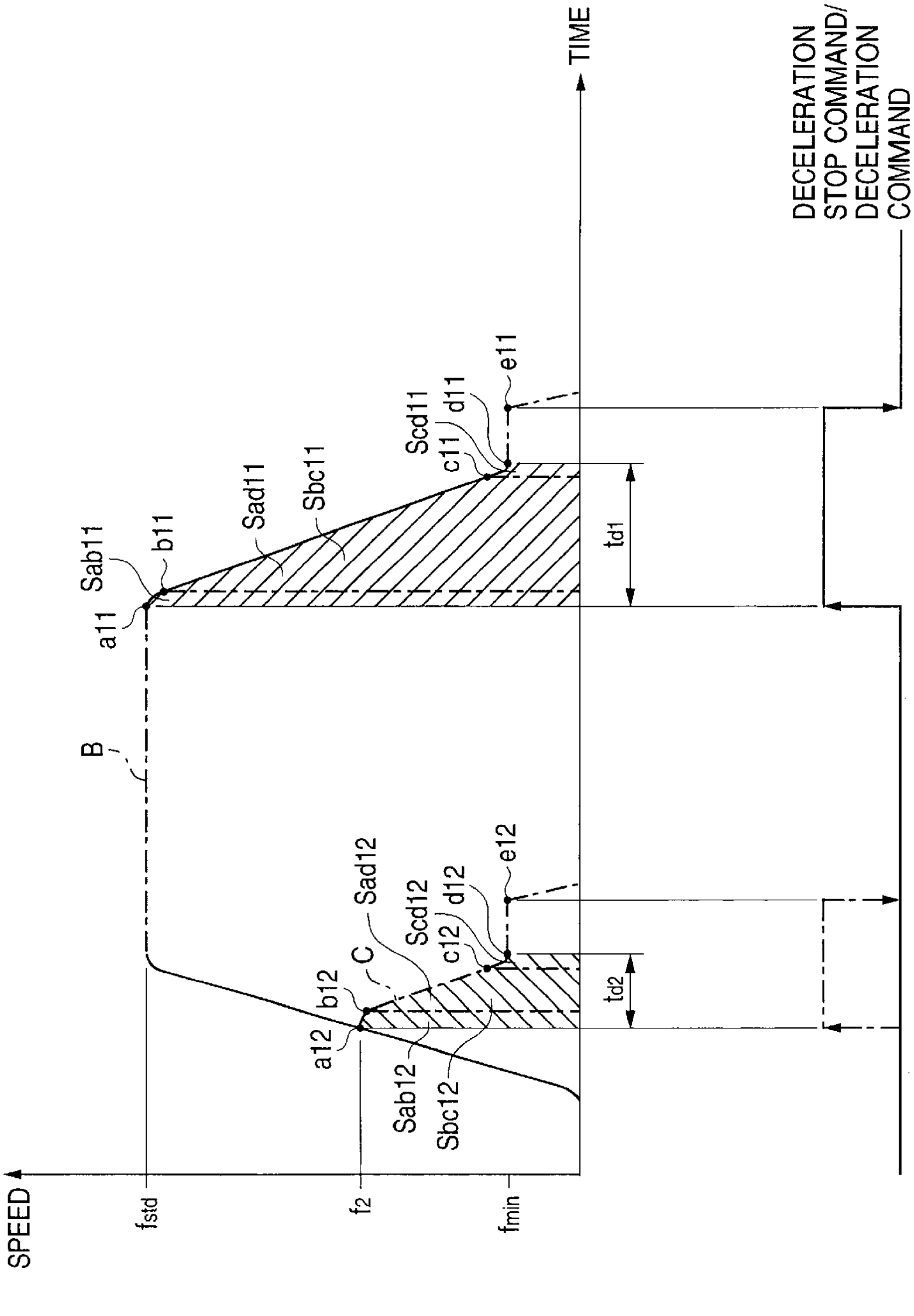
FIG. 8 is a diagram showing a control method of the conventional variable speed apparatus.
Figure 9:
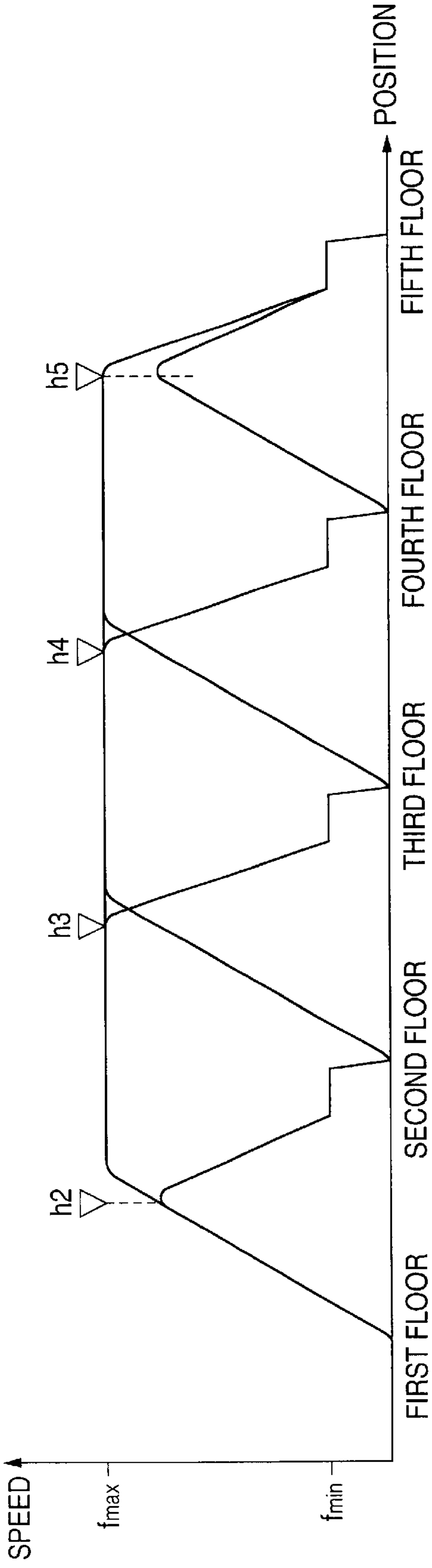
FIG. 9 is a diagram showing an operation pattern of an elevator.

FIG. 1 is a diagram showing a configuration of a variable speed apparatus according to a first embodiment of this invention. In the drawing, numerals 21 to 23, 26 are similar to those of FIG. 7 shown as a conventional example and the description is omitted. Numeral 1*a* is a variable speed apparatus, and numeral 2*a* is a storage part for storing data such as adjustable speed patterns of linear adjustable speed or S-shaped curve adjustable speed, etc. set by parameters, an adjustable speed reference frequency fstd, a frequency fmin at the time of low speed, reference acceleration time ta1 for accelerating from 0 Hz to the adjustable speed reference frequency fstd, reference deceleration time td1 for decelerating from the adjustable speed reference frequency fstd to the frequency fmin at the time of low speed, and numeral 3*a* is a control part for controlling an inverter part 23 based on various data set in the storage part 2*a* by a start command, a deceleration stop command and so on.

The control part 3*a* comprises constant speed operating frequency calculation means 11 for calculating a first constant speed operating frequency fout1 obtained by S-shaped curve acceleration from a point in time when a deceleration stop command is inputted in the case that the deceleration stop command is inputted during acceleration, and constant speed operating time calculation means 12 for calculating first constant speed operating time tr1 acting as time for performing constant speed operation at the first constant speed operating frequency fout1 in order to equalize a moving distance at the time of deceleration in the case that the deceleration stop command is inputted during acceleration to a moving distance at the time of deceleration in the case that the deceleration stop command is inputted during operation at the adjustable speed reference frequency fstd.

Figure 2:
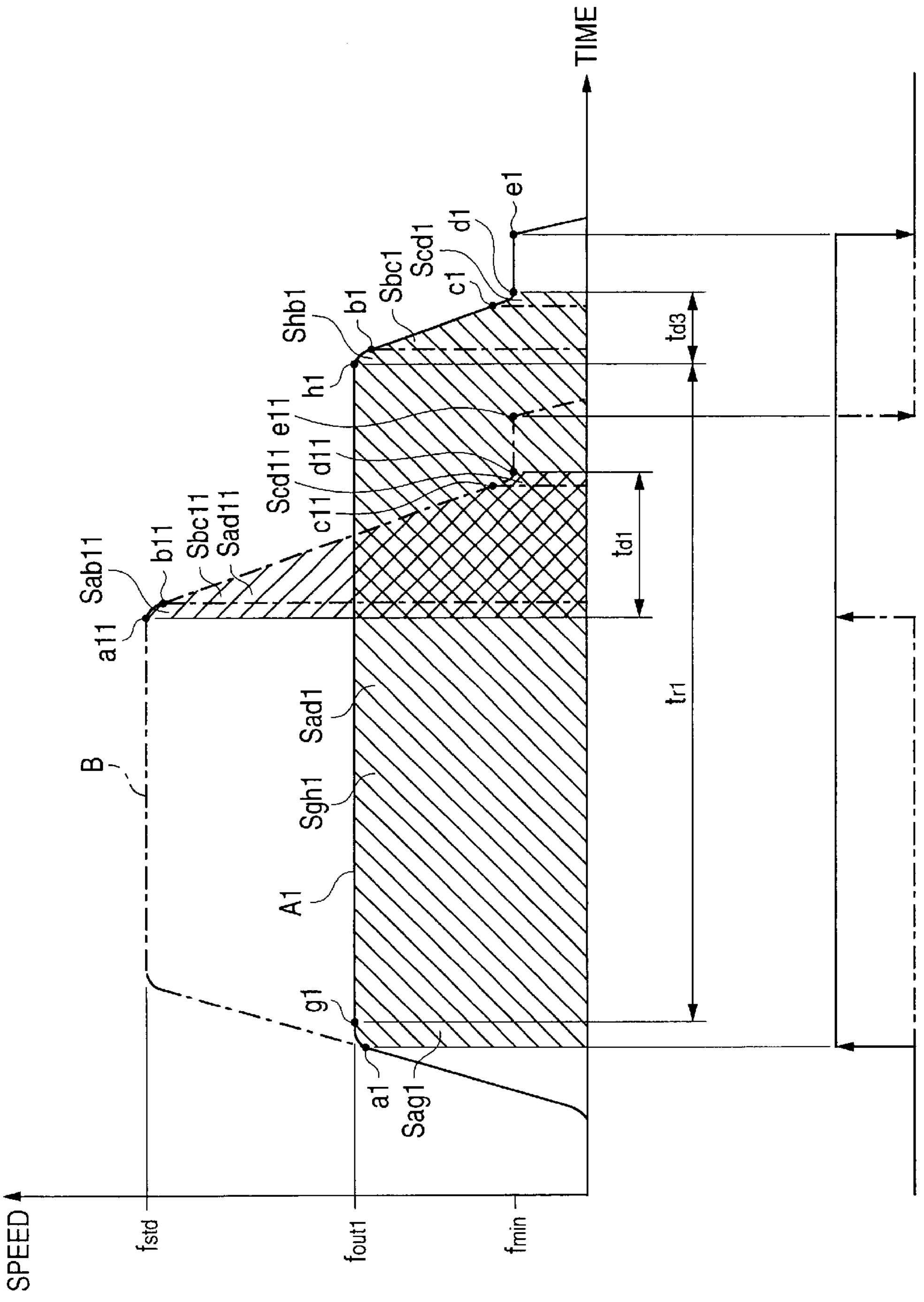
FIG. 2 is a diagram showing a control method of the variable speed apparatus according to the first embodiment of this invention.

FIG. 2 is a diagram showing a control method of the variable speed apparatus according to the first embodiment of this invention, and FIG. 2(*a*) shows an operation pattern, and FIG. 2(*b*) shows a state of a deceleration stop command/stop command. In the drawing, fstd is an adjustable speed reference frequency, and fmin is a frequency at the time of low speed, and fout1 is a first constant speed operating frequency calculated by the constant speed operating frequency calculation means 11 in the case that a deceleration stop command is inputted during acceleration. Also, td1 is reference deceleration time for decelerating from the adjustable speed reference frequency fstd to the frequency fmin at the time of low speed, and td3 is deceleration time calculated by multiplying the reference deceleration time td1 by a ratio between the first constant speed operating frequency fout1 and the adjustable speed reference frequency fstd, and tr1 is first constant speed operating time for performing constant speed operation at the first constant speed operating frequency fout1 calculated by the constant speed operating time calculation means 12. Also, A1 is an operation pattern of the case that that a deceleration stop command is inputted during acceleration, and B is an operation pattern (similar to the operation pattern B of FIG. 6 of the conventional example) of the case that a deceleration stop command is inputted during operation at the adjustable speed reference frequency fstd, and also adjustable speed showed an example of S-shaped curve adjustable speed.

Also, a1 and a11 are points in time when a deceleration stop command is inputted, and g1 is a point in time of S-shaped curve acceleration completion (a point in time of operation start at the first constant speed operating frequency fout1), and h1 is a point in time when deceleration is started after the first constant speed operating time tr1 of constant speed operation at the first constant speed operating frequency fout1. Also, b1, c1 and d1 are way points of S-shaped curve deceleration in the operation pattern A1, and b11, c11 and d11 are way points of S-shaped curve deceleration in the operation pattern B. A range between a1 and g1 is a curve acceleration interval in an S-shaped curve adjustable speed pattern, and a range between h1 and b1, a range between c1 and d1, and a range between a11 and b11, a range between c11 and d11 are curve deceleration intervals in the S-shaped curve adjustable speed pattern. Also, d1 and d11 are points in time of S-shaped curve deceleration completion, and e1 and e11 are points in time when a stop command is inputted after constant speed operation at the frequency fmin at the time of low speed.

Next, an action of the variable speed apparatus according to the first embodiment will be described by FIGS. 1 and 2.

An action of normal operation of performing variable speed control of accelerating to the adjustable speed reference frequency fstd by a start command and decelerating to the frequency fmin at the time of low speed by a deceleration stop command and making a deceleration stop by a stop command is similar to that of the conventional apparatus.

A moving distance Sad11 at the time of deceleration from deceleration start to deceleration completion in the case of the operation pattern B in which a deceleration stop command is inputted during operation at the adjustable speed reference frequency fstd becomes expression (2) as shown in the conventional example described above.

$$Sad11=Sab11+Sbc11+Scd11 \qquad \text{expression (2)}$$

Also, in an action of the case of the operation pattern A1 in which a deceleration stop command is inputted during acceleration, when a deceleration stop command is inputted (a1), acceleration is performed to the first constant speed operating frequency fout1 obtained by S-shaped curve acceleration (g1) and after the first constant speed operating time tr1 of constant speed operation at the first constant speed operating frequency fout1 (h1), deceleration to the frequency fmin at the time of low speed is started. After deceleration is performed to the frequency fmin at the time of low speed between h1 and d1 by S-shaped curve deceleration, operation is performed at the frequency fmin at the time of low speed and when a stop command is inputted (e1), a deceleration stop is made.

Also, when an area between a1 and g1 is set to Sag1 and an area between g1 and h1 is set to Sgh1 and an area between h1 and b1 is set to Shb1 and an area between b1 and c1 is set to Sbc1 and an area between c1 and d1 is set to Scd1, a moving distance Sad1 at the time of deceleration from deceleration start to deceleration completion in the case of the operation pattern A1 in which a deceleration stop command is inputted during acceleration becomes expression (4).

$$Sad1=Sag1+Sgh1+Shb1+Sbc1+Scd1 \qquad \text{expression (4)}$$

In the pattern B in which the deceleration stop command is inputted during operation at the adjustable speed reference frequency fstd and the pattern A1 in which the deceleration stop command is inputted during acceleration, in order to equalize the moving distances at the time of deceleration from deceleration start to deceleration completion, it is required that Sad1=Sad11.

Since the area Sgh1 (between g1 and h1) of constant speed operation at the first constant speed operating frequency fout1 is expressed by the product of the first constant speed operating frequency fout1 and the time tr1, the first constant speed operating time tr1 for performing constant speed operation at the first constant speed operating frequency fout1 can be obtained by expression (5) from expression (2) and expression (4).

$$tr1=Sgh1/fout1 \qquad \text{expression (5)}$$

Here, the Sgh1 described above can be obtained as Sgh1=Sad11−(Sag1+Shb1+Sbc1+Scd1) from expression (2) and expression (4).

Incidentally, in the above, an adjustable speed method has been described as S-shaped adjustable speed, but the similar effect can be obtained even in linear adjustable speed. In the case of the linear adjustable speed, in FIG. 1, it becomes a1=g1, h1=b1, a11=b11, c1=d1 and c11=d11.

In the first embodiment, it is constructed so that when a deceleration stop command is inputted during acceleration, the first constant speed operating frequency fout1 is calculated from an operating frequency at a point in time when the deceleration stop command is inputted in the constant speed operating frequency calculation means 11 and further the first constant speed operating time tr1 for performing constant speed operation at the first constant speed operating frequency fout1 is calculated in the constant speed operating time calculation means 12 and deceleration is performed after the first constant speed operating time tr1 of constant speed operation at the first constant speed operating frequency fout1 without performing deceleration immediately at a point in time when the deceleration stop command is inputted, so that even when the deceleration stop command is inputted during acceleration, switching of speed change to deceleration can be performed smoothly and also, a stop can be made in a constant position without lengthening deceleration time more than the deceleration time td2 calculated by multiplying the reference deceleration time td1 by a ratio between the operating frequency at the time of the deceleration stop command input and the adjustable speed reference frequency fstd, or operating at low speed by the frequency fmin at the time of low speed for a long time.

Second Embodiment

Figure 3:
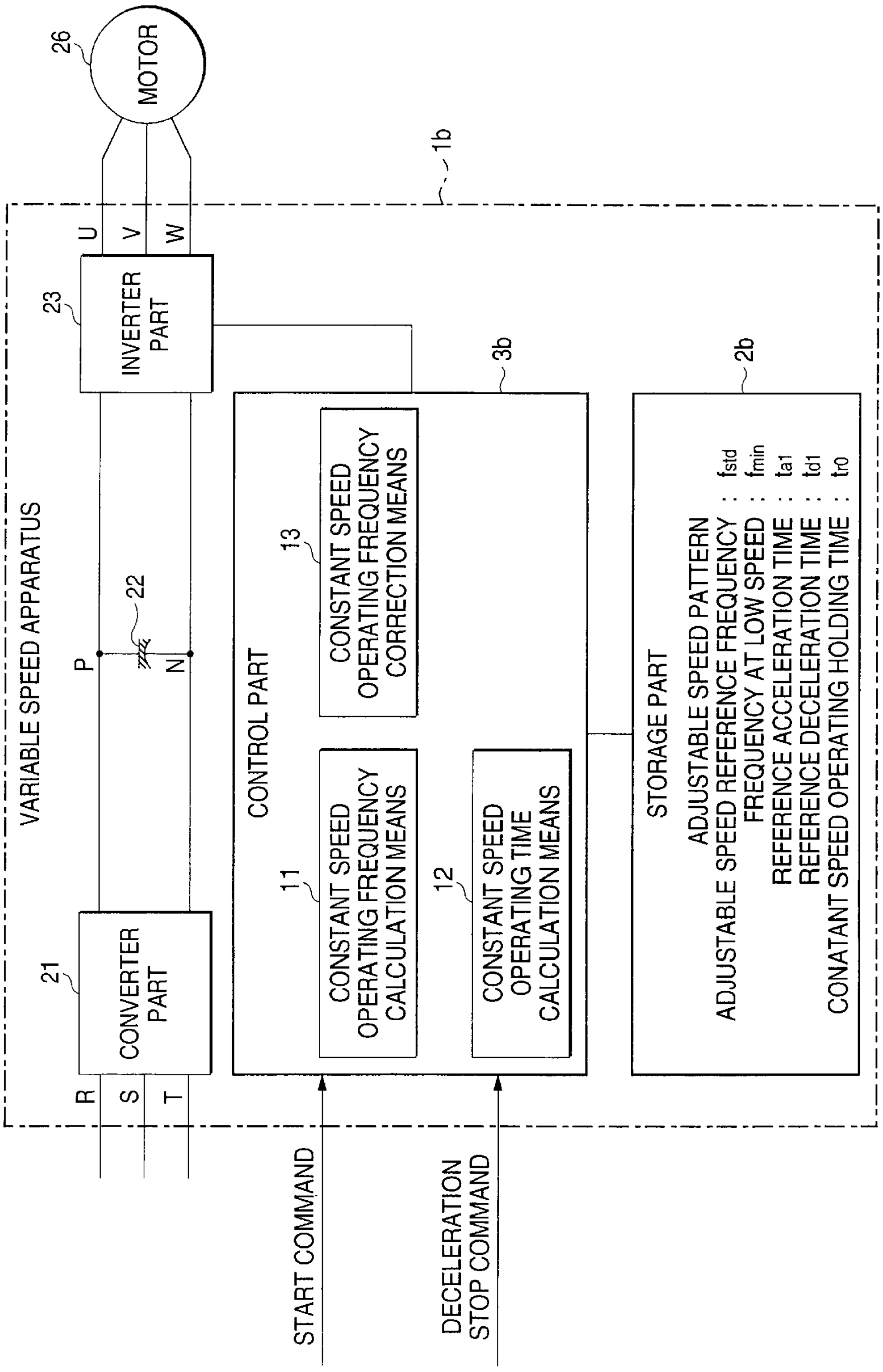
FIG. 3 is a diagram showing a configuration of a variable speed apparatus according to a second embodiment of this invention.

FIG. 3 is a diagram showing a configuration of a variable speed apparatus according to a second embodiment of this invention. In the drawing, numerals 11, 12, 21 to 23, 26 are similar to those of FIG. 1, and the description is omitted. Numeral 1*b* is a variable speed apparatus, and numeral 2*b* is a storage part for storing data such as adjustable speed patterns of linear adjustable speed or S-shaped curve adjustable speed, etc. set by parameters, an adjustable speed reference frequency fstd, a frequency fmin at the time of low speed, reference acceleration time ta1 for accelerating from 0 Hz to the adjustable speed reference frequency fstd, reference deceleration time td1 for decelerating from the adjustable speed reference frequency fstd to the frequency fmin at the time of low speed, constant speed operating holding time tr0, and numeral 3*b* is a control part for controlling an inverter part 23 based on various data set in the storage part 2*b* by a start command, a deceleration stop command and soon. Here, the constant speed operating holding time tr0 is limit operating time which does not feel long even when constant speed operation is performed at speed lower than the adjustable speed reference frequency fstd.

The control part 3*b* comprises constant speed operating frequency calculation means 11, constant speed operating time calculation means 12 and constant speed operating frequency correction means 13 for comparing first constant speed operating time tr1 calculated by the constant speed operating time calculation means 12 with the constant speed operating holding time tr0 and calculating a second constant speed operating frequency fout2 capable of operating by the constant speed operating holding time tr0 to equalize a moving distance at the time of deceleration when the first constant speed operating time tr1 is longer than the constant speed operating holding time tr0, and when the first constant speed operating time tr1 is longer than the constant speed operating holding time tr0, after acceleration is performed to the second constant speed operating frequency fout2 even after a deceleration command is inputted during acceleration, constant speed operation is performed at the second constant speed operating frequency fout2 for the constant speed operating holding time tr0 and deceleration is performed to a frequency at the time of low speed by deceleration time td4 calculated by multiplying the reference deceleration time td1 by a ratio between the second constant speed operating frequency fout2 and the adjustable speed reference frequency fstd. Here, in the constant speed operating frequency correction means 13, when a deceleration stop command is inputted during acceleration, the first constant speed operating time tr1 calculated by the constant speed operating time calculation means 12 is compared with the constant speed operating holding time tr0 preset and when the first constant speed operating time tr1 is longer than the constant speed operating holding time tr0, the second constant speed operating frequency fout2 (fout1<fout2≦fstd) capable of operating by the constant speed operating holding time tr0 to equalize the moving distance at the time of deceleration is calculated.

Figure 4:
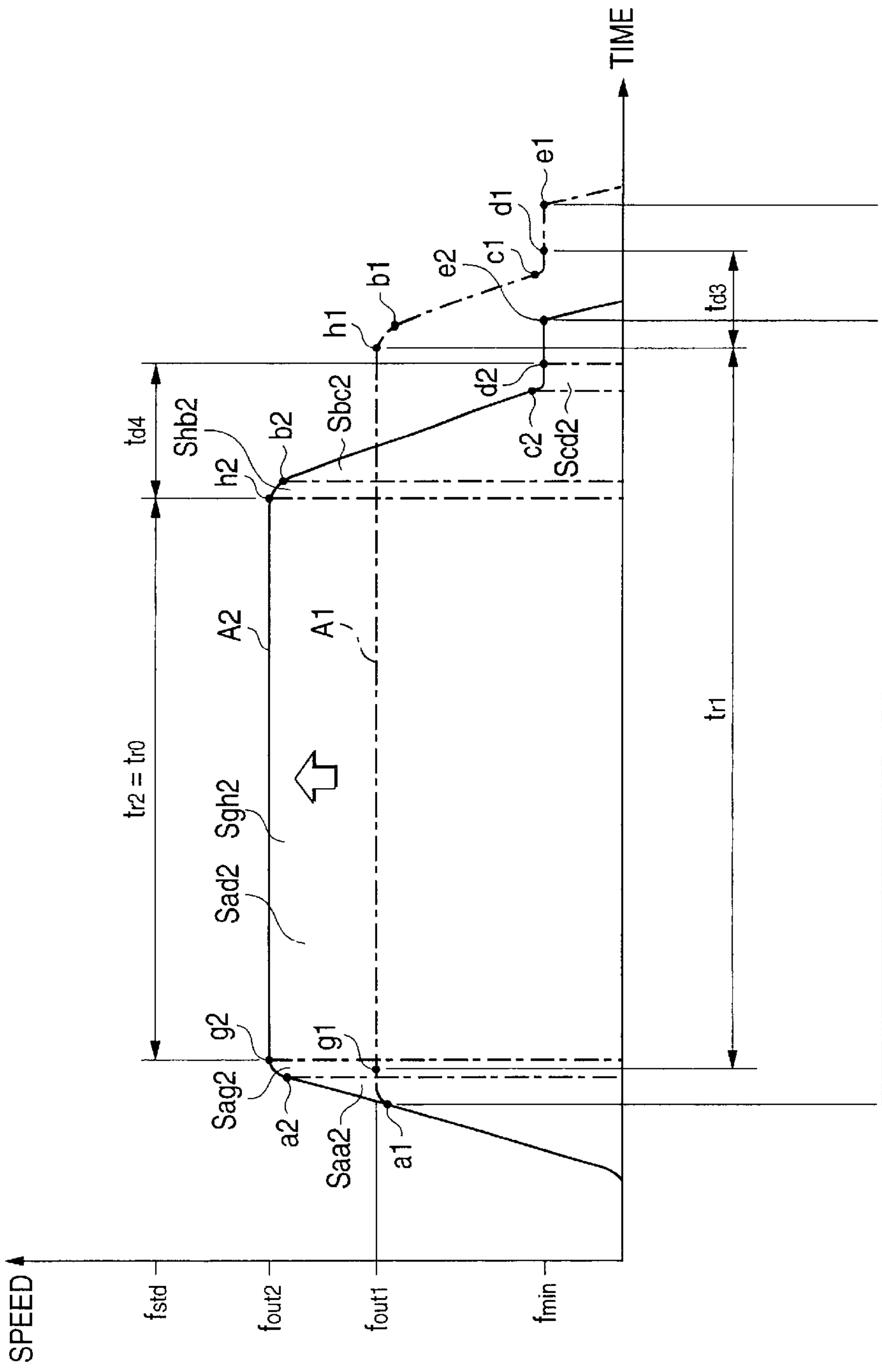
FIG. 4 is a diagram showing a control method of the variable speed apparatus according to the second embodiment of this invention.
Figure 4:

FIG. 4 is a diagram showing a control method of the variable speed apparatus according to the second embodiment of this invention, and FIG. 4(*a*) shows an operation pattern, and FIG. 4(*b*) shows a state of a deceleration stop command and a stop command. In the drawing, fstd, fmin, fout1, td3, tr1, a1, g1, h1, b1, c1, d1 and e1 are similar to those of FIG. 2 and the description is omitted. Also, fout2 is a second constant speed operating frequency. Also, tr2 is operating time for performing constant speed operation at the second constant speed operating frequency fout2 and is normally set to constant speed operating holding time tr0. Also, td4 is deceleration time calculated by multiplying the reference deceleration time td1 by a ratio between the second constant speed operating frequency fout2 and the adjustable speed reference frequency fstd. Also, A1 is an operation pattern (similar to the operation pattern A1 of FIG. 2) of the case that that a deceleration command is inputted during acceleration, and A2 is an operation pattern of the case that acceleration is performed to the second constant speed operating frequency fout2 even after a deceleration command is inputted during acceleration.

Also, a1 is a point in time when a deceleration command is inputted, and a2 is a point in time of continuous acceleration completion, and g2 is a point in time of S-shaped curve acceleration completion (a point in time of operation start at the second constant speed operating frequency fout2), and h2 is a point in time of S-shaped curve deceleration start, and b2, c2 and d2 are way points of S-shaped curve deceleration in the operation pattern A2. A range between a2 and g2 is a curve acceleration interval in an S-shaped curve adjustable speed pattern, and a range between h2 and b2 and a range between c2 and d2 are curve deceleration intervals in the S-shaped curve adjustable speed pattern. Also, d2 is a point in time of S-shaped curve deceleration completion, and e2 is a point in time when a stop command is inputted after constant speed operation at the frequency fmin at the time of low speed.

Calculation of the first constant speed operating frequency fout2 will be described below.

When an area between a1 and a2 is set to Saa2 and an area between a2 and g2 is set to Sag2 and an area between g2 and h2 is set to Sgh2 and an area between h2 and b2 is set to Shb2 and an area between b2 and c2 is set to Scd2 and an area between c2 and d2 is set to Scd2, a moving distance Sad2 at the time of deceleration from deceleration start to deceleration completion in the case of the operation pattern A2 in which a deceleration stop command is inputted during acceleration becomes expression (6).

$$Sad2=Saa2+Sag2+Sgh2+Shb2+Sbc2+Scd2 \qquad \text{expression (6)}$$

Since the area Sgh2 (between g2 and h2) of constant speed operation at the second constant speed operating frequency fout2 is expressed by the product of the second constant speed operating frequency fout2 and the operating time tr2, the second constant speed operating frequency fout2 can be obtained by expression (7) from expression (2) and expression (6).

$$fout2=Sgh2/tr2 \qquad \text{expression (7)}$$

Here, tr2=tr0 and also, the Sgh2 can be obtained as Sgh2=Sad11−(Saa2+Sag2+Shb2+Sbc2+Scd2) from expression (2) and expression (6).

In the above, the description has been made by an example in which the constant speed operating holding time tr0 is preset by parameter in the variable speed apparatus, but it may be constructed so that the constant speed operating holding time can be set corresponding to operating speed.

The first constant speed operating frequency fout1, which is calculated on the basis of an operating frequency at a point in time when a deceleration stop command is inputted as shown in the first embodiment, is equal to an operating frequency at a point in time when the deceleration stop command is inputted (for linear acceleration) or is somewhat higher than the operating frequency at a point in time when the deceleration stop command is inputted (for S-shaped curve acceleration), and in the case that the operating frequency at a point in time when the deceleration stop command is inputted is low, the first constant speed operating frequency fout1 also becomes a low value.

In the second embodiment, it is constructed so that length of the first constant speed operating time tr1 for performing constant speed operation at the calculated first constant speed operating frequency fout1 is determined and when the first constant speed operating time tr1 is longer than the constant speed operating holding time tr0, acceleration is continued to the second constant speed operating frequency fout2 even after a deceleration command is inputted (a1) as shown in the operation pattern A2 and after the time tr2 (tr2≦tr0) of constant speed operation at the second constant speed operating frequency fout2, deceleration is performed to the frequency fmin at the time of low speed by the deceleration time td4.

In the second embodiment, it is constructed so that when a deceleration stop command is inputted during acceleration (a1), the first constant speed operating frequency fout1 and the first constant speed operating time tr1 are calculated and then, when the first constant speed operating time tr1 is longer than the constant speed operating holding time tr0, the second constant speed operating frequency fout2 (fout2>fout1) is calculated and acceleration is continued to the second constant speed operating frequency fout2 even after the deceleration command is inputted during acceleration (a1) and after the constant speed operating holding time tr0 of constant speed operation at the second constant speed operating frequency fout2, deceleration is performed, so that a stop can be made in a constant position without operating at low speed for a long time even when the deceleration stop command is inputted during acceleration in which an operating frequency is low.

Third Embodiment

Figure 5:
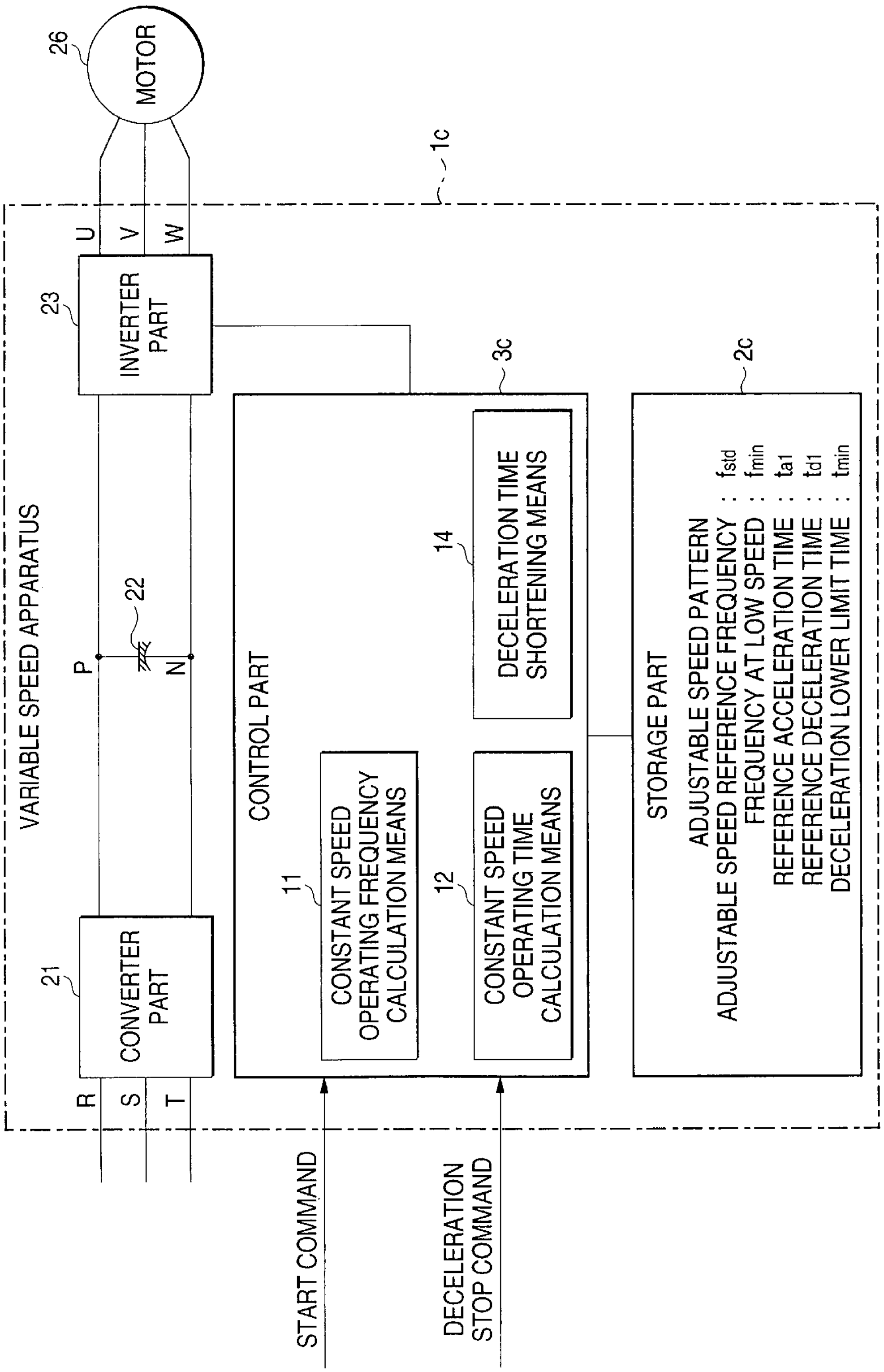
FIG. 5 is a diagram showing a configuration of a variable speed apparatus according to a third embodiment of this invention.

FIG. 5 is a diagram showing a configuration of a variable speed apparatus according to a third embodiment of this invention. In the drawing, numerals 11, 12, 21 to 23, 26 are similar to those of FIG. 1, and the description is omitted. Numeral 1*c* is a variable speed apparatus, and numeral 2*c* is a storage part for storing data such as adjustable speed patterns of linear adjustable speed or S-shaped curve adjustable speed, etc. set by parameters, an adjustable speed reference frequency fstd, a frequency fmin at the time of low speed, reference acceleration time ta1 for accelerating from 0 Hz to the adjustable speed reference frequency fstd, reference deceleration time td1 for decelerating from the adjustable speed reference frequency fstd to the frequency fmin at the time of low speed, constant speed operating holding time tr0, deceleration lower limit time tmin, and numeral 3*c* is a control part for controlling an inverter part 23 based on various data set in the storage part 2*c* by a start command, a deceleration stop command and so on.

The control part 3*c* comprises constant speed operating frequency calculation means 11, constant speed operating time calculation means 12 and deceleration time shortening means 14 for determining first constant speed operating time tr1 calculated by the constant speed operating time calculation means 12 and shortening deceleration time when the first constant speed operating time tr1 becomes minus.

A moving distance Sad1 at the time of deceleration from deceleration start to deceleration completion in the case that a deceleration stop command is inputted during acceleration can be obtained as expression (4) as shown in the first embodiment described above.

$$Sad1=Sag1+Sgh1+Shb1+Sbc1+Scd1 \qquad \text{expression (4)}$$

Also, the first constant speed operating time tr1 for performing constant speed operation at a first constant speed operating frequency fout1 can be obtained as expression (5) as shown in the first embodiment described above.

$$tr1=Sgh1/fout1 \qquad \text{expression (5)}$$

Here, the Sgh1 described above can be obtained as Sgh1=Sad11−(Sag1+Shb1+Sbc1+Scd1) from Sad1=Sad11.

In the case that a point in time (a1) when a deceleration stop command is inputted during acceleration is close to the adjustable speed reference frequency fstd, the first constant speed operating time tr1 obtained by the expression (5) may become minus by movement in a curve acceleration interval (a1 to g1) and a constant speed operating interval (g1 to h1). In the case that the first constant speed operating time tr1 becomes minus, a moving distance at the time of deceleration overshoots even though the first constant speed operating time tr1 for performing constant speed operation at the first constant speed operating frequency fout1 is set to zero.

Figure 6:
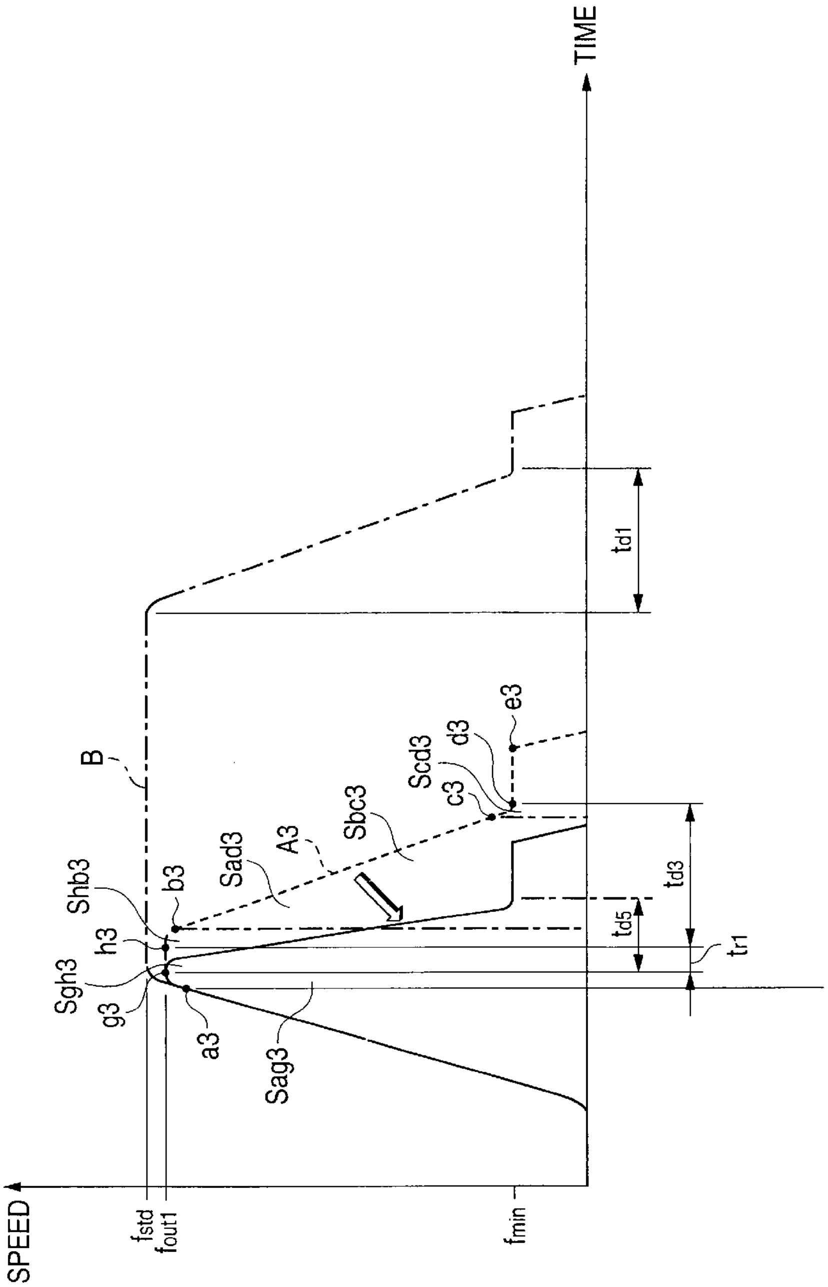
FIG. 6 is a diagram showing a control method of the variable speed apparatus according to the third embodiment of this invention.
Figure 6:
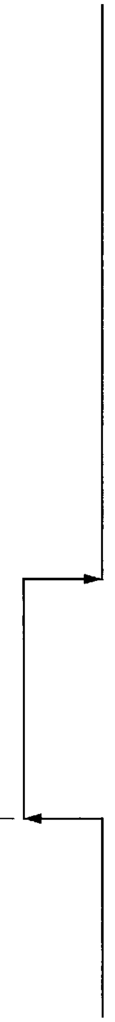

FIG. 6 is a diagram showing a control method of the variable speed apparatus according to the third embodiment of this invention, and FIG. 6(*a*) shows an operation pattern, and FIG. 6(*b*) shows a state of a deceleration stop command and a stop command. In the drawing, fstd, fmin, td1, fout1, tr1 and td3 are similar to those of FIG. 2 and the description is omitted. Also, a3 is a point in time when a deceleration command is inputted, and g3 is a point in time of S-shaped curve acceleration completion (a point in time of operation start at the first constant speed operating frequency fout1), and h3 is a point in time when deceleration is started after the first constant speed operating time tr1 of constant speed operation at the first constant speed operating frequency fout1. Also, b3, c3 and d3 are way points of S-shaped curve deceleration in an operation pattern A3. A range between a3 and g3 is a curve acceleration interval in an S-shaped curve adjustable speed pattern, and a range between h3 and b3 and a range between c3 and d3 are curve deceleration intervals in the S-shaped curve adjustable speed pattern. Also, d3 is a point in time of S-shaped curve deceleration completion, and e3 is a point in time when a stop command is inputted after constant speed operation at the frequency fmin at the time of low speed.

Also, when an area between a3 and g3 is set to Sag3 and an area between g3 and h3 is set to Sgh3 and an area between h3 and b3 is set to Shb3 and an area between b3 and c3 is set to Sbc3 and an area between c3 and d3 is set to Scd3, a moving distance Sad3 at the time of deceleration from deceleration start to deceleration completion in the case of the operation pattern A3 in which a deceleration stop command is inputted during acceleration is similar to expression (4) in the operation pattern A1 shown in the first embodiment described above and becomes expression (8).

$$Sad3=Sag3+Sgh3+Shb3+Sbc3+Scd3 \qquad \text{expression (8)}$$

Also, the first constant speed operating time tr1 for performing constant speed operation at the first constant speed operating frequency fout1 is similar to expression (5) shown in the first embodiment described above and can be obtained by expression (9).

$$tr1=Sgh3/fout1 \qquad \text{expression (9)}$$

Here, the Sgh3 described above can be obtained as Sgh3=Sad11−(Sag3+Shb3+Sbc3+Scd3) from Sad3=Sad11.

In the case that tr1=0, Sgh3=0 and it becomes Sad11=Sag3+Shb3+Sbc3+Scd3, but Sag3, Shb3 and Scd3 are S-shaped curve adjustable speed portions and Sbc3 is reduced (time of b3 to c3 is shortened) and thereby, a moving distance at the time of deceleration from deceleration start to deceleration completion is kept constant. Therefore, deceleration time td5 needs to be shortened than deceleration time td3 calculated by multiplying the reference deceleration time td1 by a ratio between the first constant speed operating frequency fout1 and the adjustable speed reference frequency fstd (td3>td5>deceleration lower limit time tmin). Here, the deceleration lower limit time tmin is time acting as a lower limit in the case of changing the deceleration time td3 calculated by multiplying the reference deceleration time td1 by a ratio between the first constant speed operating frequency fout1 and the adjustable speed reference frequency fstd.

In the first embodiment described above, an example constructed so that deceleration is performed to the frequency fmin at the time of low speed by the deceleration time td3 calculated by multiplying the reference deceleration time td1 by a ratio between the first constant speed operating frequency fout1 and the adjustable speed reference frequency fstd has been shown, but in the third embodiment, it is constructed so that when the first constant speed operating time tr1 becomes minus, a moving distance is adjusted by shortening the deceleration time td5 than deceleration time td3 calculated by multiplying the reference deceleration time td1 by a ratio between the first constant speed operating frequency fout1 and the adjustable speed reference frequency fstd, so that a deceleration stop can be made smoothly even in the case that a speed at a point in time when a deceleration command is inputted is close to the adjustable speed reference frequency.

INDUSTRIAL APPLICABILITY

As described above, a control method at the time of deceleration stop of a variable speed apparatus according to the present invention is suitable for use in application for making a stop in a constant position like an elevator.

What is claimed is:

1. A variable speed apparatus comprising:

a converter part for converting AC electric power into DC electric power;

a smoothing capacitor for smoothing a DC voltage converted by the converter part;

an inverter part for converting the DC electric power into AC electric power of a variable frequency and a variable voltage; and a control part for controlling the inverter part to make a deceleration stop after decelerating to a frequency at the time of low speed by deceleration time calculated by multiplying preset reference deceleration time by a ratio between an operating frequency at the time of deceleration stop command input and an adjustable speed reference frequency when a deceleration stop command is inputted, wherein the control part comprises:

constant speed operating frequency calculation means for calculating a first constant speed operating frequency for performing constant speed operation when the deceleration stop command is inputted during acceleration;

constant speed operating time calculation means for calculating first constant speed operating time by the first constant speed operating frequency in order to equalize a moving distance at the time of deceleration from deceleration start to deceleration completion in the case that the deceleration stop command is inputted during acceleration to a moving distance at the time of deceleration from deceleration start to deceleration completion in the case that the deceleration stop command is inputted during operation at the adjustable speed reference frequency; and constant speed operating frequency correction means for calculating a second constant speed operating frequency for operating by constant speed operating holding time when the first constant speed operating time is longer than the constant speed operating holding time preset, and when the deceleration stop command is inputted during acceleration and the first constant speed operating time calculated by the constant speed operating time calculation means is longer than the constant speed operating holding time preset, acceleration is further continued to the second constant speed operating frequency and operation is performed at the second constant speed operating frequency by the constant speed operating holding time and then deceleration is performed to the frequency at the time of low speed by deceleration time calculated by multiplying the reference deceleration time by a ratio between the second constant speed operating frequency and the adjustable speed reference frequency.

2. A variable speed apparatus comprising:

a converter part for converting AC electric power into DC electric power;

a smoothing capacitor for smoothing a DC voltage converted by the converter part;

an inverter part for converting the DC electric power into AC electric power of a variable frequency and a variable voltage; and a control part for controlling the inverter part to make a deceleration stop after decelerating to a frequency at the time of low speed by deceleration time calculated by multiplying preset reference deceleration time by a ratio between an operating frequency at the time of deceleration stop command input and an adjustable speed reference frequency when a deceleration stop command is inputted, wherein the control part comprises:

constant speed operating frequency calculation means for calculating a first constant speed operating frequency for performing constant speed operation when the deceleration stop command is inputted during acceleration;

constant speed operating time calculation means for calculating first constant speed operating time by the first constant speed operating frequency in order to equalize a moving distance at the time of deceleration from deceleration start to deceleration completion in the case that the deceleration stop command is inputted during acceleration to a moving distance at the time of deceleration from deceleration start to deceleration completion in the case that the deceleration stop command is inputted during operation at the adjustable speed reference frequency; and deceleration time shortening means for determining the first constant speed operating time calculated by the constant speed operating time calculation means and shortening deceleration time calculated by multiplying the reference deceleration time by a ratio between the first constant speed operating frequency and the adjustable speed reference frequency in order to equalize a moving distance at the time of deceleration from deceleration start to deceleration completion in the case that the deceleration stop command is inputted during acceleration to a moving distance at the time of deceleration from deceleration start to eceleration completion in the case that the deceleration stop command is inputted during operation at the adjustable speed reference frequency when the first constant speed operating time becomes minus.

* * * * *